March 25, 1930.   H. S. MOORE   1,751,874
AUTOMOBILE HANDLING APPARATUS
Filed June 19, 1928   2 Sheets-Sheet 1
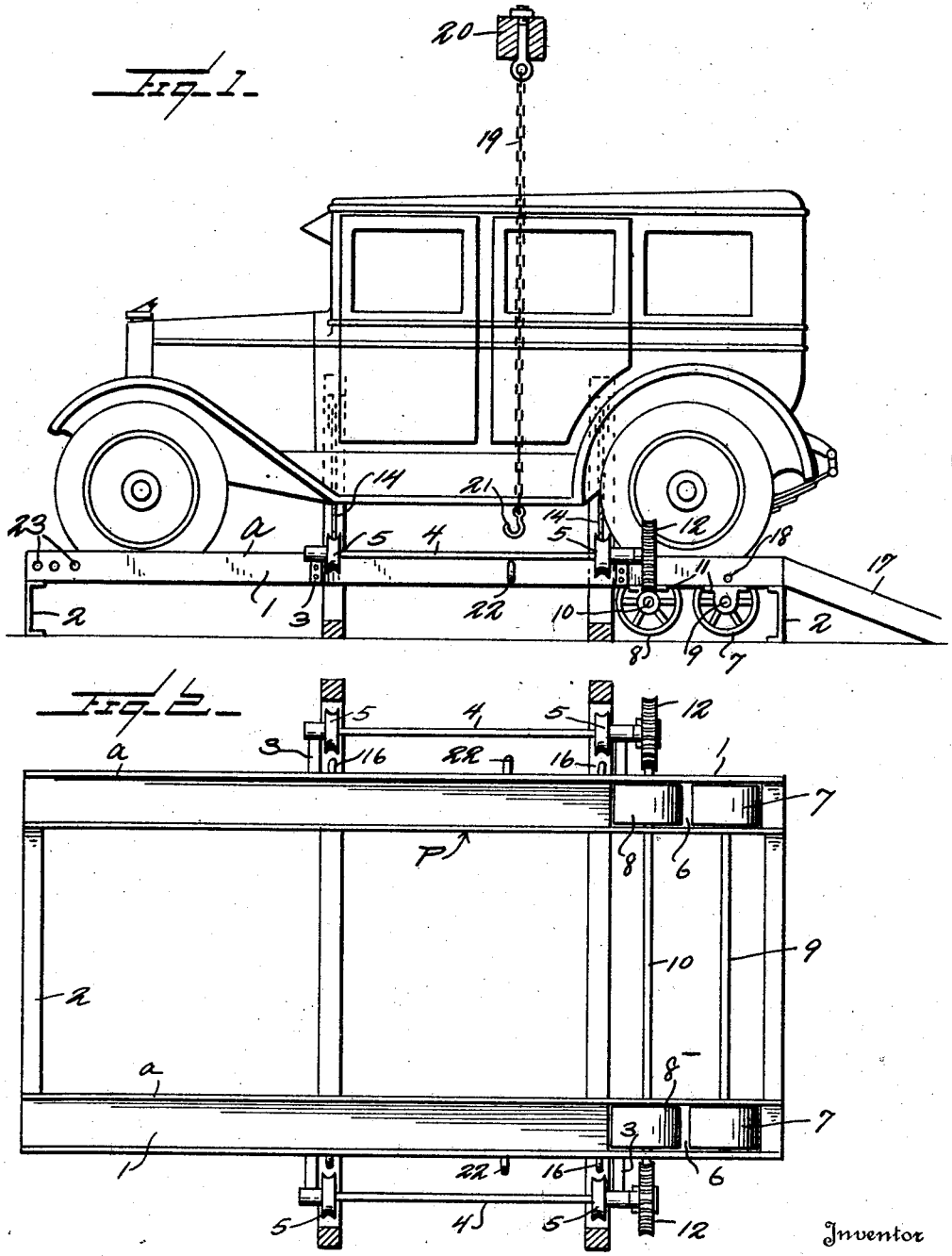
Inventor
H. S. Moore
By Watson E. Coleman
Attorney Inventor
H. S. Moore
By Watson E. Coleman
Attorney Patented Mar. 25, 1930

1,751,874

UNITED STATES PATENT OFFICE

HORATIO S. MOORE, OF BELLEFONTE, PENNSYLVANIA

AUTOMOBILE HANDLING APPARATUS

Application filed June 19, 1928. Serial No. 286,592.

This invention relates to automobile handling apparatus, and it is an object of the invention to provide a device of this kind whereby an automobile may be lifted under its own power.

Another object of the invention is to provide an apparatus of this kind for lifting an automobile in order to facilitate the removal or application of tires and such work upon the vehicle as may be best performed from below.

The invention consists in the details of construction and in the combination and arrangement of the several parts of my improved automobile handling apparatus whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein:—

Figure 1 is a view in side elevation with portions in section illustrating an automobile handling apparatus constructed in accordance with an embodiment of my invention;

Figure 2 is a view in top plan of the structure as illustrated in Figure 1 with certain of the parts in section and the vehicle omitted;

Figure 4:
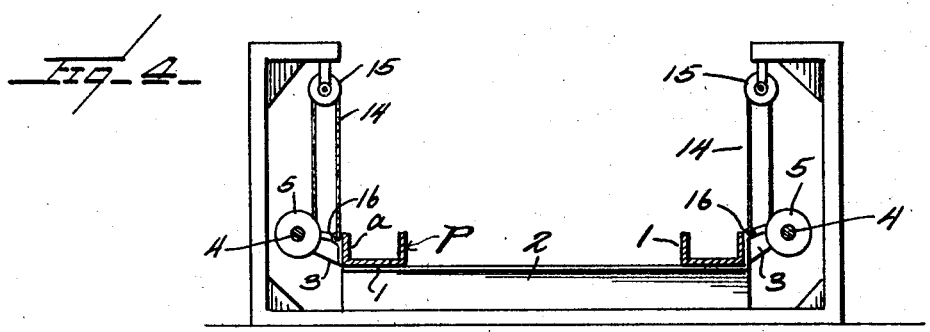
Figure 4 is a transverse sectional view taken through Figure 2 and somewhat of a diagrammatic character.
Figure 5:
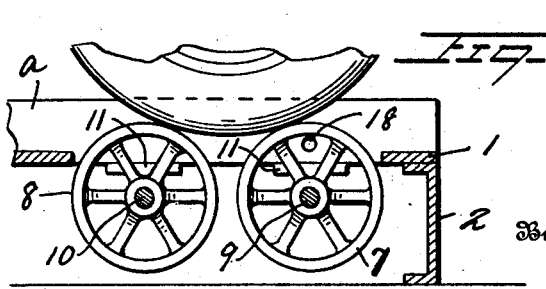
Figure 5 is an enlarged fragmentary detailed view partly in section and partly in elevation illustrating the driving means as herein embodied.

As herein disclosed, my improved apparatus comprises a platform P embodying the parallel trackways 1 suitably connected by the cross members or sills 2. The sills 2 underlie the trackways 1 and in the present embodiment of my invention provide a support for the platform when said platform is in its lowermost position and in contact with the ground or kindred surface, as particularly illustrated in Figures 1, 4 and 5.

Each of the trackways 1 comprises preferably a channel member having relatively high side flanges a. Extending upwardly from the opposite sides of the platform are the outboard bearings 3 providing mountings for the shafts 4, said shafts being in parallelism with respect to each other and the trackways 1. Each of the shafts 4 at desired points spaced thereon has fixed thereto winding drums or pulleys 5.

The base portions of the trackways 1 closely adjacent to an end of the platform P are provided with the cut out portions 6 through which extend from below the aligned pulleys 7 and 8 fixed respectively to the shafts 9 and 10. The shafts 9 and 10 are disposed transversely of the platform and rotatably supported by the depending bearings 11. The pulleys 7 and the associated shaft 9 are idle while the pulleys 8 and shaft 10 constitute a driving means for the shafts 4, the extremities of the shafts 10 being in driving connection, as at 12, with the adjacent end portions of the shafts 4. These driving connections 12 may be as preferred but preferably through the instrumentality of worm gears of desired ratio to cause the shafts 4 to rotate at a materially reduced speed with respect to the shaft 10.

Winding upon the drums or pulleys 5 are the flexible members or cables 14 which are secured at one end to the pulleys 5 and wind therearound and extend upwardly and over the sheaves 15 supported a desired distance above the ground or other surface, the members or cables 14 extending downwardly from the sheaves 15 and being suitably anchored at the opposite end, as at 16, to the platform P. Upon rotation of the pulleys 7 and 8 and the resultant rotation of the shafts 4 in the one direction, the members or cables 14 will wind upon the drums or pulleys 5 resulting in the lifting or elevating of the platform P and the platform will be held against dropping movement by gravity as a result of the locking action afforded by the worm drives 12. As a result of such locking action in order to lower the platform it is necessary that the shaft 10 be driven in the opposite or reverse direction.

When the platform P is in its lowered position the chock 17 is employed in connection with the end of each of the trackways 1 adjacent to the pulleys 7 so that a motor vehicle may be driven up upon the platform P. The flanges a of each of the trackways 1 are provided with the openings 18 through which a rod or kindred elongated member is adapted to be inserted for interlocking engagement with a pulley 7 so that as the vehicle is driven upon the platform the wheels of said vehicle will readily pass over the pulleys 7 to bring the drive wheels of the vehicle into proper contact from above with each pair of adjacent pulleys 7 and 8. The pulleys 7 are then released and as the drive wheels of the vehicle operate the shaft 10 will be rotated to effect the requisite winding of the members or cables 14 upon the drums or pulleys 5 to elevate the platform P and the vehicle thereon a desired height. When the platform P has been raised or elevated as desired, a fulcrum medium is engaged with said platform preferably at a point rearwardly of the longitudinal center of the platform. As herein disclosed, the fulcrum medium comprises a flexible member 19 for coaction with each side portion of the platform and suspended from a suitable stationary support 20 with the lower extremity of the member carrying a hook 21 for engagement with an eye member 22 or the like carried by the adjacent side of the platform P. After the platform P with its load has been lifted to desired height, suitable supporting members M are engaged with the opposite end portions of the vehicle or load to support the same independently of the platform P. The drive wheels are then driven in reverse to unwind from the drums or pulleys 5 the members or cables 14.

Figure 3:
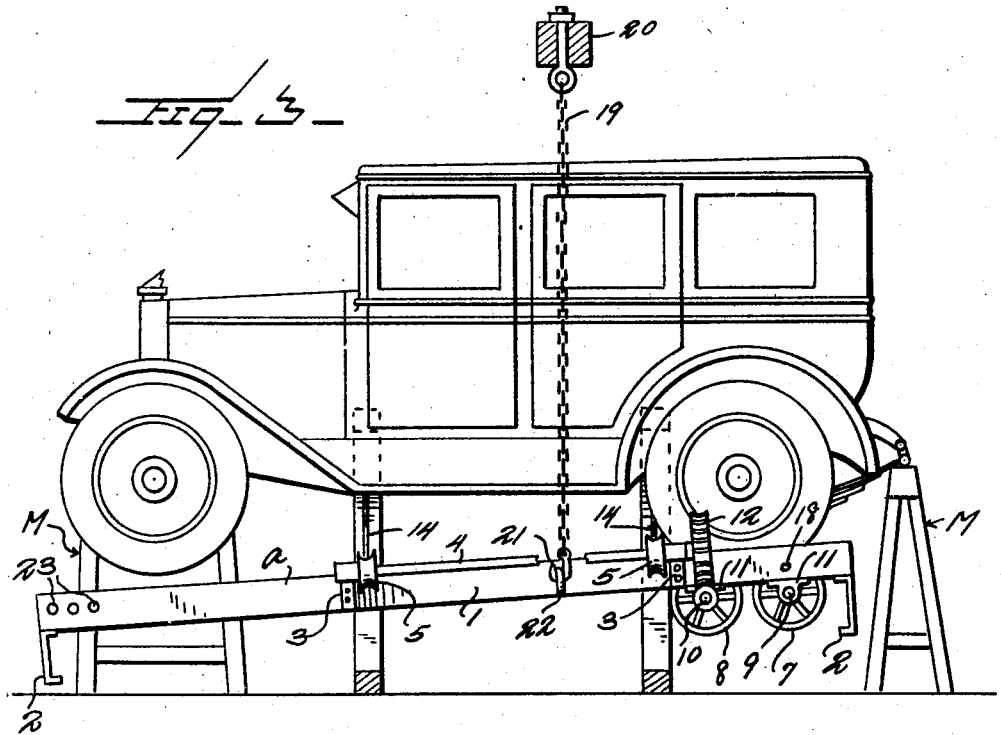
Figure 3 is a view similar to Figure 1 showing the apparatus in lifting adjustment and the platform comprised in the apparatus in a position to facilitate working upon the front wheels.

During this operation, as is particularly illustrated in Figure 3, the platform will swing upon the fulcrum medium to cause the forward end portion of the platform to drop below and away from the front wheels of the vehicle while the rear portion of the platform will swing upwardly to assure the pulleys 7 and 8 being maintained in requisite contact with the rear or drive wheels of the vehicle so that when it is desired to lower the vehicle the forward rotation of the drive wheels of the vehicle will result in turning the platform in proper contact with the front and rear wheels of the vehicle and to lift the vehicle a distance sufficiently to facilitate the removal or disengagement of the fulcrum medium. After the platform has been elevated to again contact with all of the wheels, the fulcrum medium may be released from the platform P, and the drive wheels of the vehicle rotated in reverse direction resulting in the desired lowering of the platform and vehicle.

By providing the desired fulcrum medium whereby the platform may be vertically swung with respect to the vehicle it will be readily understood that tires may be conveniently applied or removed. Should it be desired to remove or apply the rear tires it is only required that the lower forward end of the platform be manually lifted whereupon the rear portion of the platform will swing downwardly away from such rear wheels. In practice this lifting of the forward portion of the platform requires but slight effort on the part of the operator and said forward end will be maintained in such lifted position by any suitable support or prop.

The forward end portion of each of the trackways 1 has its side flanges provided with a series of longitudinally spaced openings 23 to provide means whereby the forward end of each trackway may be intersected by a rod or kindred member to provide means for limiting the extent of forward movement of the vehicle upon the platform. The openings 23 are spaced to compensate for vehicles of varying wheel bases. It is to be added, however, that this stopping means is not at all times necessary.

From the foregoing description it is thought to be obvious that an automobile handling apparatus constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:—

1. An automobile handling apparatus comprising a platform having a pair of spaced trackways, means for holding said trackways in spaced relation to each other and to a floor or the ground, a pair of transverse shafts rotatably mounted beneath said trackways and spaced inwardly from one end thereof, said shafts being mounted in spaced relation to each other, a plurality of drums rotatably mounted on said shafts and within said trackways, a gear secured to each of the opposite ends of one of said transverse shafts, a pair of parallel shafts rotatably mounted outwardly of said trackways, a gear secured to one end of said shafts and adapted to engage said first gear whereby to turn said parallel shafts cooperatively with said transverse shafts, a plurality of posts mounted on the floor or ground, winding means secured to said parallel shafts and engaging guide means on said posts whereby to raise the platform upon the turning of the drums, and holding means for holding the platform in raised position.

2. An automobile handling apparatus comprising a platform having a pair of spaced trackways, means for holding said trackways in spaced relation to each other and to a floor or the ground, a plurality of transverse shafts rotatably mounted beneath said trackways, a plurality of drums mounted on said shafts and within said trackways, a gear secured to the opposite end portions of one of said transverse shafts, a pair of parallel shafts rotatably mounted outwardly of said trackways, a second gear secured to one end of said shafts and adapted to engage said first gear whereby to turn said parallel shafts cooperatively with said transverse shafts, a pair of drums mounted on each of said parallel shafts, a plurality of guide posts mounted outwardly of said drums on said parallel shafts, a plurality of pulleys rotatably secured to said guide posts, rope means adapted to engage said drums and said pulleys whereby to raise the platform, and means for holding the platform in raised position.

In testimony whereof I hereunto affix my signature.

HORATIO S. MOORE.